United States Patent [19]
Marlin et al.

[11] Patent Number: 5,778,377
[45] Date of Patent: Jul. 7, 1998

[54] TABLE DRIVEN GRAPHICAL USER INTERFACE

[75] Inventors: James Warden Marlin, Longmont; Raymond Lowell Knudson; Thomas Michael Ruehle, both of Boulder; Anthony Franke Stuart, Jamestown; Edward Thomas Hughes, III, Arvada, all of Colo.

[73] Assignee: International Business Machines Corporation, Armonk, N.Y.

[21] Appl. No.: 334,810

[22] Filed: Nov. 4, 1994

[51] Int. Cl.⁶ ............................................ G06F 17/30
[52] U.S. Cl. ........................ 707/103; 370/254; 370/335; 707/4; 707/10; 707/102
[58] Field of Search ........................ 395/600, 575, 395/650, 100, 200, 155, 604, 610, 614, 613; 370/254, 335

[56] References Cited

U.S. PATENT DOCUMENTS

| | | | |
|---|---|---|---|
| 4,251,858 | 2/1981 | Cambigme et al. | 364/132 |
| 4,495,572 | 1/1985 | Bosen | 364/200 |
| 4,862,345 | 8/1989 | Lekron | 364/188 |
| 4,933,967 | 6/1990 | Lo et al. | 379/207 |
| 4,941,091 | 7/1990 | Breault et al. | 364/406 |
| 4,969,093 | 11/1990 | Barker et al. | 364/900 |
| 5,008,827 | 4/1991 | Sansone et al. | 364/464.02 |
| 5,041,992 | 8/1991 | Cunningham et al. | 395/135 |
| 5,077,694 | 12/1991 | Sansone et al. | 395/600 |
| 5,157,783 | 10/1992 | Anderson et al. | 395/600 |
| 5,220,674 | 6/1993 | Morgan et al. | 395/800 |
| 5,261,098 | 11/1993 | Katin et al. | 395/650 |
| 5,272,767 | 12/1993 | Asmuth et al. | 382/305 |
| 5,283,856 | 2/1994 | Gross et al. | 395/51 |
| 5,291,602 | 3/1994 | Barker et al. | 395/700 |
| 5,297,249 | 3/1994 | Bernstein et al. | 395/356 |
| 5,327,529 | 7/1994 | Fults et al. | 395/155 |
| 5,381,470 | 1/1995 | Cambray et al. | 379/216 |
| 5,398,336 | 3/1995 | Tantry et al. | 395/600 |
| 5,406,322 | 4/1995 | Port et al. | 348/15 |
| 5,423,003 | 6/1995 | Berteau | 395/200 |

FOREIGN PATENT DOCUMENTS

| | | |
|---|---|---|
| 449438A2 | 10/1991 | European Pat. Off. . |
| 499404A2 | 8/1992 | European Pat. Off. . |
| 558224A1 | 9/1993 | European Pat. Off. . |

OTHER PUBLICATIONS

Steve Moore, "IBM Pledges Desktop Interface Support," *Computerworld*, vol. 28, Issue 44, Oct. 31, 1994.

David Buerger, "Back to Reality," *Network World*, vol. 11, Issue 42, Oct. 17, 1994.

Skip McAskill, "DMTF Finalizes Desktop Management Specification," *Network World*, vol. 11, Issue 17, Apr. 25, 1994.

Shannon Gray-Voigt, "Bringing Standard Management to Desktop Computing," *Network World*, vol. 11, Issue 44, Oct. 31, 1994.

DMTF, (Apr. 29, 1994), "Desktop Management Interface Specification—Version 1.0".

DMTF (Oct. 31, 1994), "Large Mailing Operations Standards Specification—Version 1.0".

*Primary Examiner*—Thomas G. Black
*Assistant Examiner*—Cheryl R. Lewis
*Attorney, Agent, or Firm*—Charles E. Rohrer

[57] ABSTRACT

A Graphical User Interface (GUI) is provided for workstations on a network in which a complex operation is controlled. At least one node on the network has a Desktop Management Interface (DMI) with an object oriented database for storing data objects for the complex operation. Objects are organized according to the DMI into components, groups and attributes. The GUI is generic to any complex operation but requires the DMI for access to data. The GUI enables the user to manage information in the database in whatever manner the user has interest through the provision of report definitions through which specific component, group, and attribute data are obtained in accordance with row and column definitions for table display. The DMI interface is probed with appropriate commands generated by the GUI to obtain and display the requested data. Provision is made for displaying data in chart format and a chain feature is provided to move from one report to another. Various other features are provided.

16 Claims, 9 Drawing Sheets

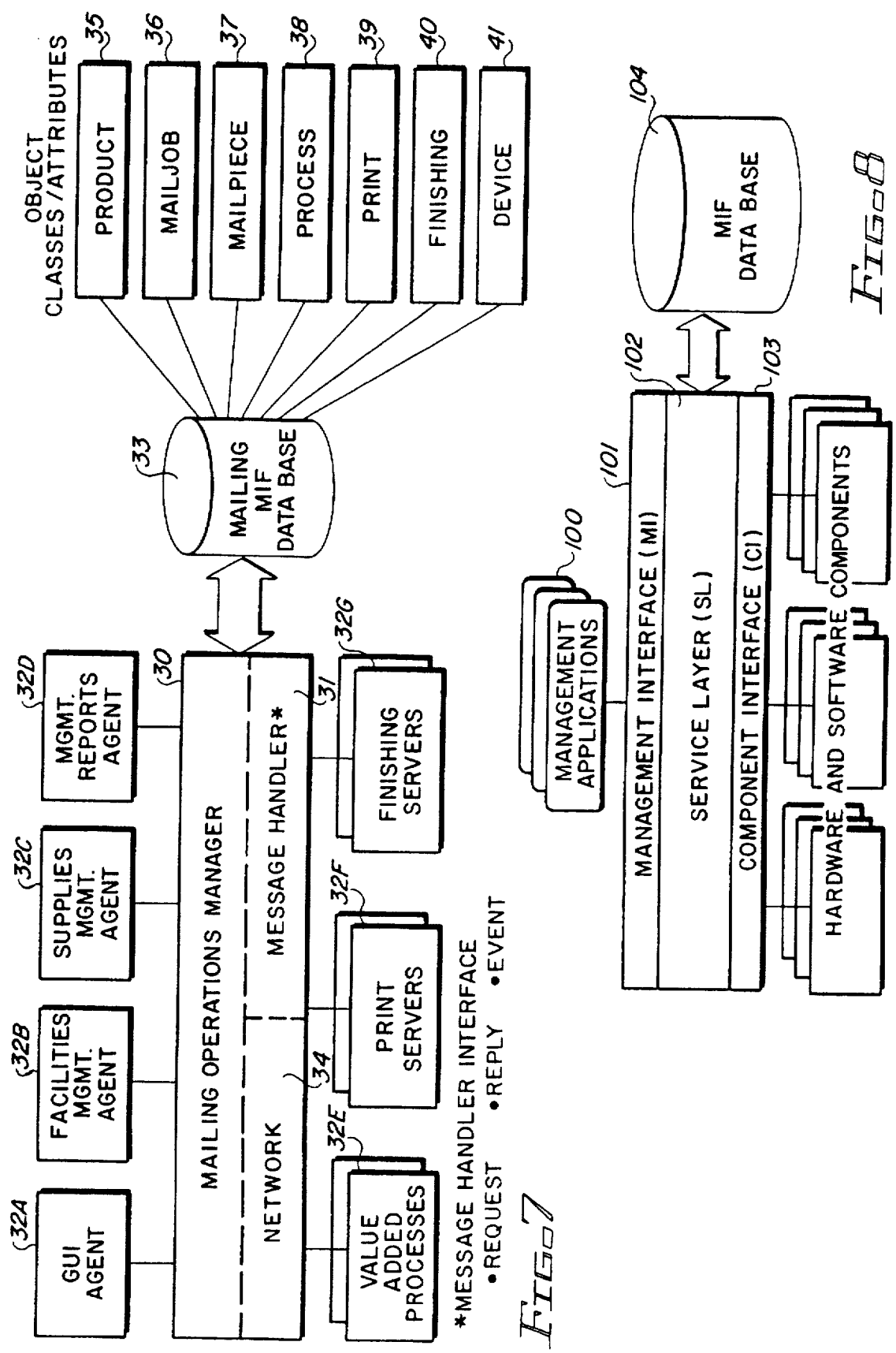

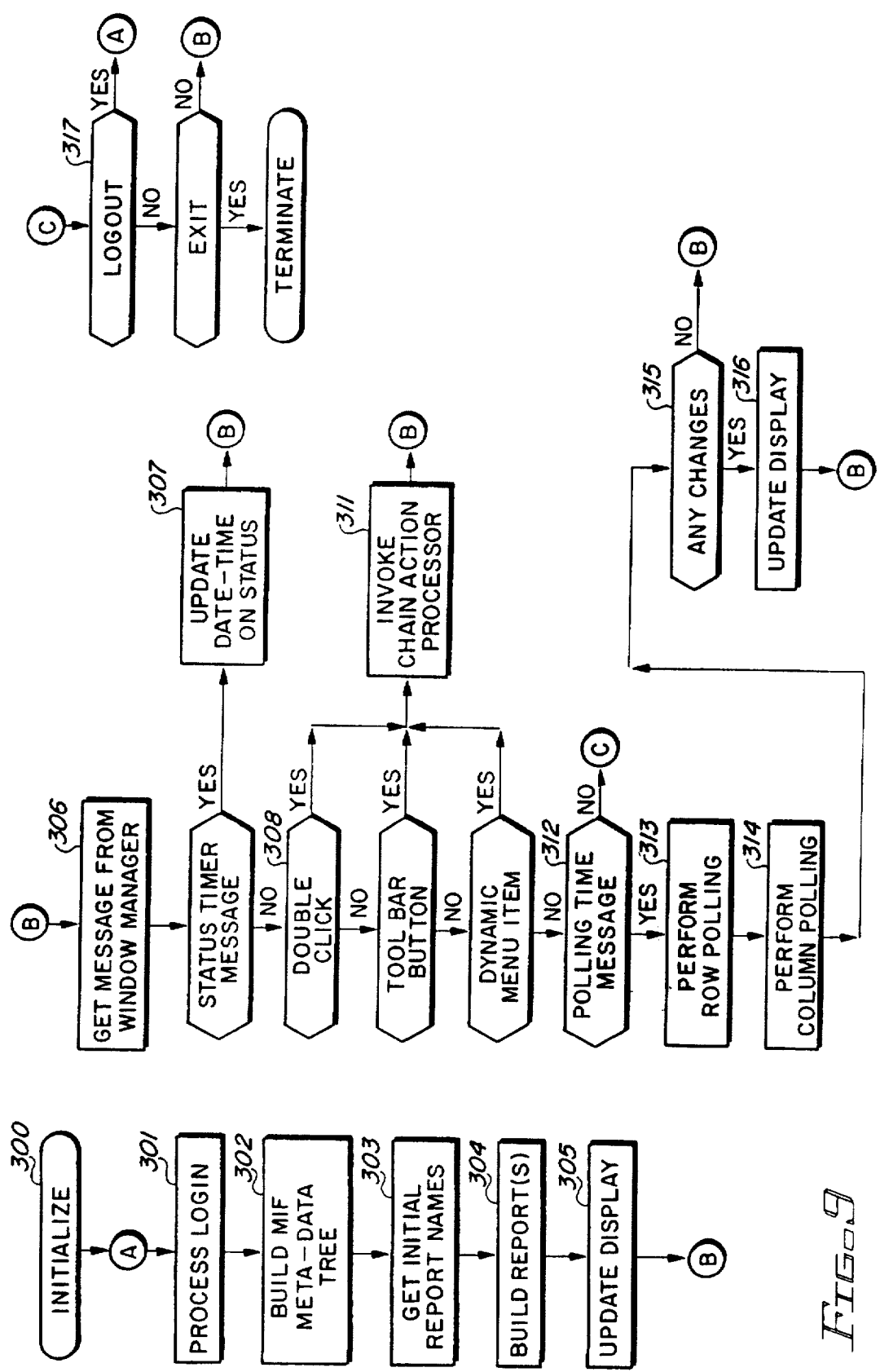

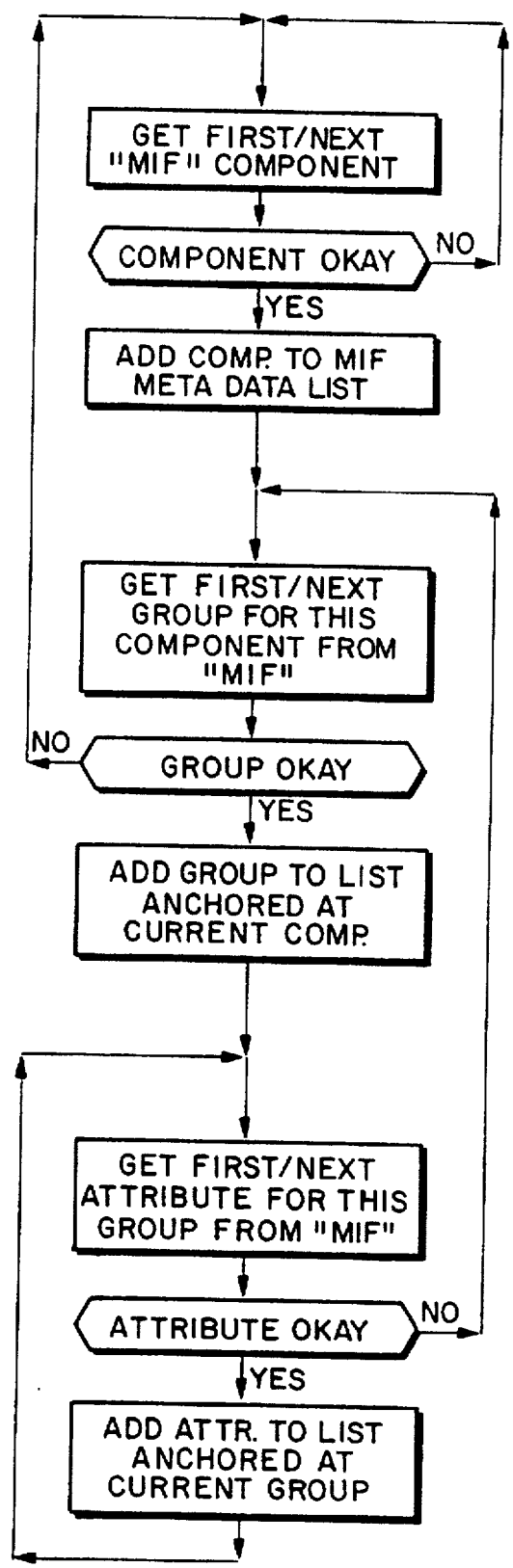
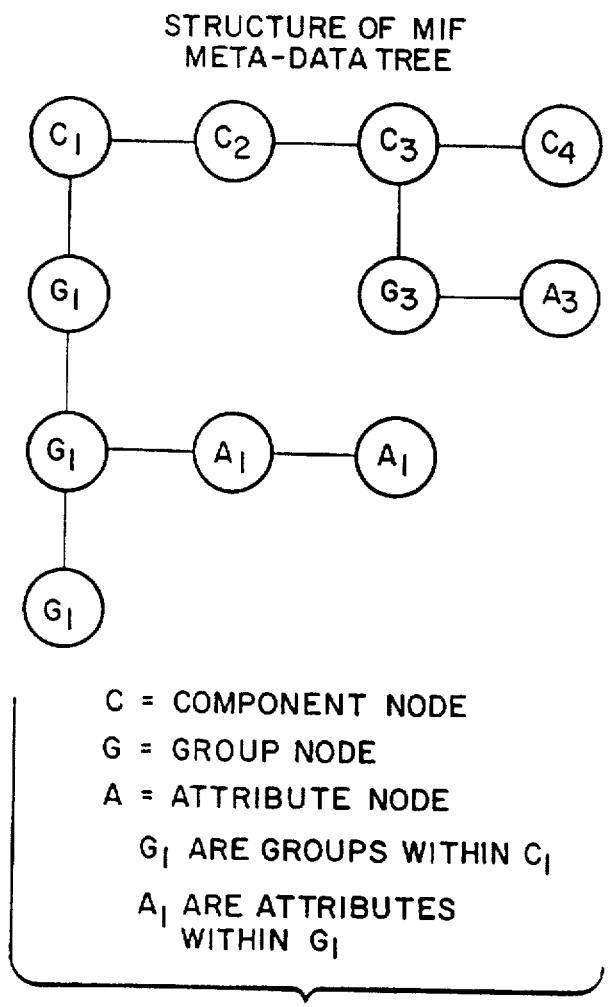
FIG. 10A
FIG. 10B

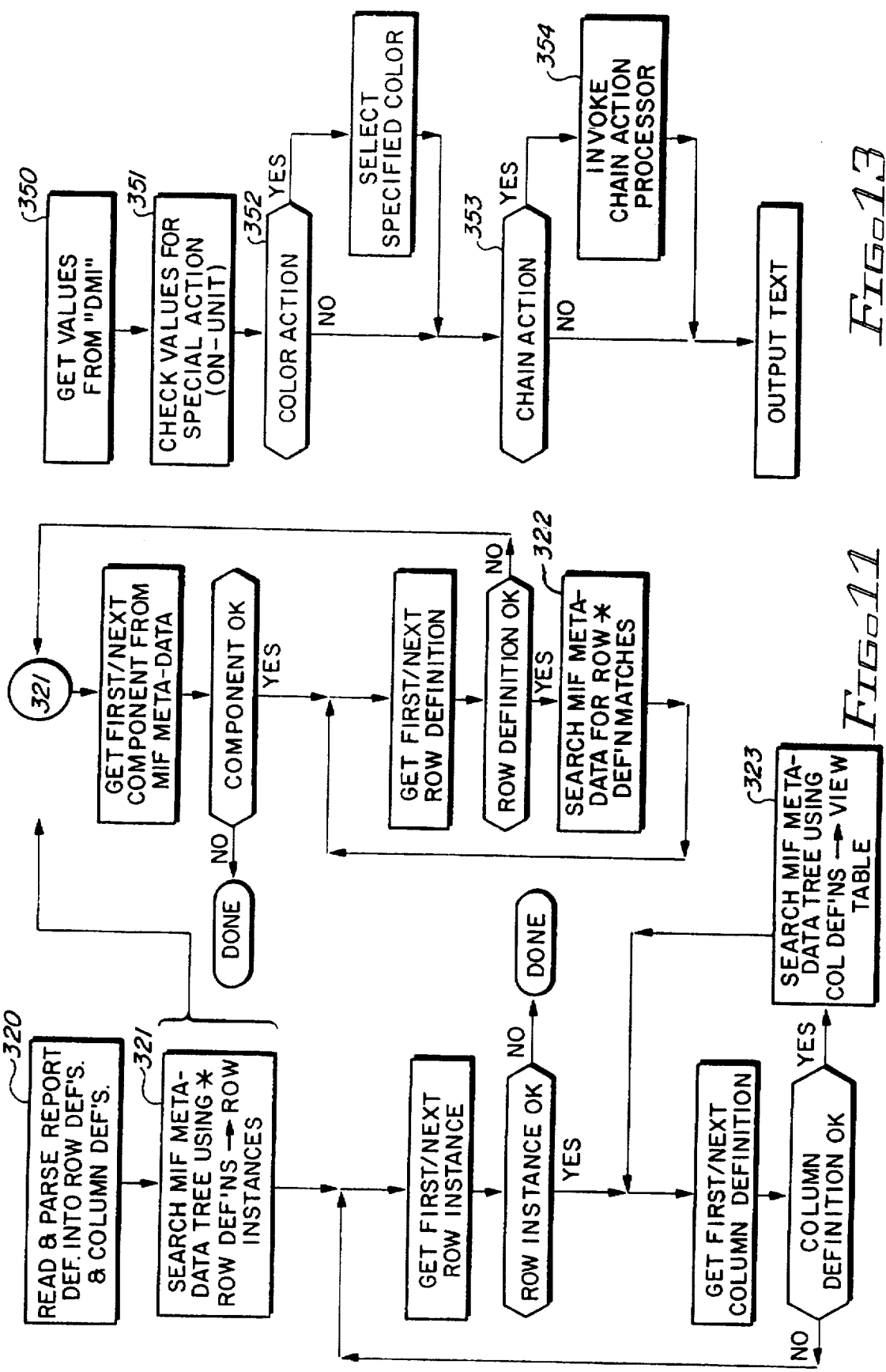

TABLE DRIVEN GRAPHICAL USER INTERFACE

This invention relates to the automated management of a complex environment in which one or more nodes may include a graphical user interface, which is generic for any report desired within a desktop management interface environment.

CROSS REFERENCE TO RELATED APPLICATIONS

Several patent applications filed concurrently herewith relate to the invention herein. They are patent application Ser. No. 08/334,592 entitled, "Instrumented Components for Accessing Complex Object-oriented Data Files" now U.S. Pat. No. 5,546,517; patent application Ser. No. 08/334,584 entitled "Desktop Management of Host Applications" now U.S. Pat. No. 5,680,615; and patent application Ser. No. 08/334,948 entitled "Client Network Interface".

BACKGROUND OF THE INVENTION

The desire to develop control technologies in order to produce end-products more efficiently, or more cheaply, or of higher quality has existed for many years. Machines utilizing mechanical controls, hydraulic controls, or pneumatic controls were developed in the eighteenth century. With the advent of electrical technology, the increased ability to control the movement of work pieces from one work station to another down conveyor lines enabled a significant advance in the cost, efficiency and quality objectives of control technology. With the development of computers, particularly general purpose computers, control technology became much more flexible. Improvements in the control of a process could be effected by changes in software, as opposed to changes in hardware which were necessary on the earlier systems. Also, computer technology brought about the ability to automate processes not previously subject to machine control. For example, accounting work that was previously done by hand with the aid of simple adding machines or other calculating devices of that sort were automated by computerized systems to produce end-products in a much more efficient and less costly manner. The preparation of documents has been automated to some extent by the use of word processors. Generally speaking, computers have enabled the automation of information processes much the same as in an earlier day the electrical technology enabled the automatic movement of work pieces down a conveyor line.

The continued development of semi-conductor technology has enabled enormous computing capacity in very small computing elements. As a result, microprocessors have found use within machinery as control elements, replacing cams and gears and relays and other such devices of the previous control technologies. As a result the flexibility of programmed microprocessors is now available in many types of equipment. With microprocessor control of machines so pervasive, there occurs the need that various types of equipment in a work process be tied together and report to various processors which can manage the overall operation. Management may occur at the process level, i.e., to send a work piece from one work station to another and perform the operations called for, and it can occur on an information level as well, i.e., for example, processes can acquire information about machines so that they can be maintained prior to a breakdown, processes can schedule jobs, maintain inventories and automatically perform other accounting functions.

The particular complex environment in which the current invention was developed is the large mail room operation. In such an operation a variety of documents must be printed, fed along conveyor lines for correlation with other documents to comprise the particular mailing, through devices which may trim the documents, fold them, place them in envelopes and place them on trays. The envelopes will have a printed address so that a weighing mechanism may determine the postage that is needed and place the postage on the envelope. There are machines to sort mail according to zip codes and by walk sequence, i.e., the sequence that a mail carrier will follow delivering mail along a particular route. Finally, the outputs may be boxed according to the location to which they are sent and delivery automatically ordered for the next airplane leaving for that location.

In the large mailroom, information about recipients might be included in a database. For example, certain mailings may go to those people who are known to enjoy golf and other mailings may go to people who are in the dental profession. Some mail room operators may wish to track the effectiveness of marketing promotions. For example, people in a certain area might be targeted to receive a discount on an item and coupons for those people would receive a certain bar code. Another area might receive a different discount and have a different bar code. Later, once the coupons are returned, data relating the amount of interest developed by the promotion can be accumulated by reading the bar codes and automatically producing the reports.

As may be observed from the above description the amount of data which is organized in large mail room operations is enormous. It is not unusual for these operations to include banks of computers, banks of data storage equipment, various types of printers from many different manufacturers and complex inserting equipment capable of merging documents from several paths into one stack, folding, cutting, inserting, franking, sorting, and packaging.

In the current environment marks may be placed on the paper in a certain location so that scanning those marks can trigger the correct operation to direct that particular paper along its route to its destination in the proper envelope. Such marks can be on each page of a document or they can be on header pages. Such marks might require the trimming of a document before it is actually sent out to a customer.

FIG. 1 shows a simplified configuration that is utilized at the current time in print mail room facilities. The print job originates with application processes on a host 16 which is typically a large mainframe computer, making use of database facilities attached to the host. The generated print stream is converted into a device specific data stream and sent to the controller 11A of printer 11 for production of documents. An unwinder mechanism 10 is used to unwind rolls of paper and feed the paper into the printer 11. The printer output is passed to a folding machine 12 and organized on trays 13. The tray 13 is moved manually to provide input to a second line of machinery which may include devices to cut and trim the stacks of paper into individual documents and feed the documents through an inserting machine 14. Inserting machines are complex devices under the control of a microprocessor based controller 14A. The inserter may also receive documents from other document feeding devices and envelopes from another printing source for inserting the proper group of documents into a properly addressed envelope. The envelope may then pass through a franking machine and through sorting apparatus before being placed on trays 15 from which the properly sorted mail is packaged and sent off to the Post Office. An important advantage of the configuration as shown in FIG. 1 is that the printer line is separated from the inserter line of machinery. As a consequence the problems of matching the speed of these two lines is eliminated and printers are not held up by the operations of the inserters or vice versa. Such a configuration also makes the printer available for non-mail jobs. One of the important disadvantages is that marks are needed on each document or at least on header papers to correctly move the job through the equipment and into the proper envelope.

FIG. 2 shows a coupled configuration which is also in use at the current time. Again, the print job originates in the host 16 and in its large database and the print stream is sent to the controller 11A of printer 11. In this configuration an unwinder mechanism 10 unwinds a roll of paper for feeding to a printer 11, the output of which is directly coupled to the inserter line 14. The advantages of this type of configuration is that a folding machine 12 in the printer line is eliminated. Only a single operator is needed and the output of the printer is packaged for immediate mailing. An important disadvantage is that the operations of the inserter and the printer must be speed matched. Also, in this configuration the printer is dedicated to mail applications and the system is only as reliable as its weakest link. Marks on the paper are still needed to coordinate the documents from a printer with envelopes fed into the inserter from a different document feeder.

FIG. 3 shows a system which may be termed an intelligently coupled configuration. This system is similar to the configuration shown in FIG. 2 except that the controller 11A for the printer and the controller 14A for the inserter are enabled to exchange information so that as documents are printed, the printer can inquire if the inserter is ready. If it is, then the printer can send the document on to the inserter. This system enables the printer to communicate with the host 16 that originates the print job and provide the host with information about the inserting equipment that is connected to the printer. As a consequence, the system is enabled to ascertain the capabilities present on the equipment in the print path. This system also enables processes running on the host to advise the printer and the other equipment in the path when a job begins and when a job ends so that the need for marks on the paper is diminished or completely eliminated. This system also provides an error recovery operation such that if a job is completed without incident that can be recorded. This system provides software control over the process but still retains certain disadvantages. For example, the speed between the printer and the inserter still must be matched. The entire line is only as reliable as its weakest link and the printer is dedicated to mail applications.

FIG. 4 shows a network coupled configuration for which this invention is designed. The print jobs originate with application processes at a host 16 for generating a print stream sent to the controller 11A of a printer 11 in much the same manner as the other configurations described above. In this system, FIG. 4 shows an unwinder mechanism 10 is used to unwind rolls of paper and send them to a printer 11. It should be noted that paper input to the printer could be from cut sheet document feeders, a continuous form feeder or any other type of paper feeder. The output of the printer 11 is sent to a medium modifier 17 which may be, for example, a mechanism to imprint a color plate on a medium, or make a perforation cut on a page to be returned by a recipient. From the medium modifier, the document path leads to a folder mechanism 12 for stacking the documents on a tray 13. In this configuration the printer line is separated from the inserter line. Consequently, there is a movement of the tray 13 to the input of the inserter line which is illustrated in FIG. 4 as a manual movement. In this configuration there is direct communication between the controller 14A in the inserter 14 with the system manager located on the network 18. Likewise, the system manager has direct communication with the controller 11A of printer 11 and perhaps with other devices in the system that have microprocessor based control. The communication may be either direct or through communication with the controller 11A in the printer or the controller 14A in the inserter. In that manner, error recovery procedures may be implemented throughout the system. The marks needed on paper are kept to a minimum. There still must be marks in order to identify jobs from the printer line when they reach the inserter. Speed matching is not a problem in this system since the printer line and the inserter line are separate and consequently the printer is available for non-mail jobs.

FIG. 5 is a more complete description of the system shown in FIG. 4 and shows that host 16 is connected into network 18. A customer application 20 is run on the host 16 to generate a print job. During that generation various value-add programs and indexing programs 21 may add to the print data stream and include data in the print files. Such programs may, for example, add bar codes for sorting files in zip sequence and generate the codes needed for proper finishing of the print job. Print files 22 and index files 23 may be created. Print Service Facility (PSF) 24 which also runs on host 16 will generate the print data stream for driving the printer 11. The system manager 25 resides on a work station which is connected into the network 18. The network may be either a local area network (LAN) or a wide area network (WAN). Also connected into the network are various work stations illustrated as graphical user interface (GUI) 26 and graphical user interface (GUI) 27 which may be placed in various locations for different purposes. For example, one may be at the inserter for the use of the operator of that line, one might be at the printer for the operator of that line, one might be at a warehouse for the warehouse manager to check the need for supplies as they are being used, e.g., paper, toner, etc.

In the system shown in FIG. 5, mutilated mail pieces are reprinted on demand on a smaller remote print station 28 attached to the network. In that manner, replacement documents are automatically generated as the system automatically senses the mutilation of a document.

FIG. 6 shows a generic interface model for the large mail room system of FIG. 5. Such a system is a coordinated set of hardware and software components and interfaces that work together to automate the output processes associated with high volume printing, finishing and delivery of individual mail pieces. Work begins in the data processing portion of the system with applications 20 that generate print data 20A. In many instances these applications are existing "legacy" applications on large mainframes that produce many types of large mailings such as, for example, the billing statements of utilities for customers. As shown in FIG. 6 the print data 20A from customer applications is further processed by value-add applications 21A and advanced function presentation (AFP) functions 21B that condition the data for printing and prepare object files 21C, D, and E for downstream operations.

In today's modern environment there are many tools available to assist in generating customized print output. Examples of value-add functions are programs which provide address verification, presorting of statements by their postal characteristics, programs 21G for building insertion instructions based on information contained in demographic and marketing databases and programs 21F for segmenting print data into manageable units of work.

Examples of advanced function presentation functions are services that convert line data into page data, build document index objects for locating individual groups of pages and building print files for reprint, viewing and archiving services for storing and retrieving the manageable printing units of work.

Host value-add programs and AFP services are designed to be application independent so that they do not require changes in the customer's print producing applications in order to perform their function. Once the VA and AFP process is complete the print files are scheduled for printing. Control information for the insertion process is separately sent to the finishing server when the finishing hardware is not in line in the print path. Bar code or optical recognition marks on the paper are used by the finishing server to correlate the finishing instructions for a print job with individual mail pieces to be assembled and packaged for postal delivery.

FIG. 7 shows a generic model of the system manager, mailing operations manager 30, which must provide a message handler interface 31 that is used by all of the various hardware and software processors 32A–G to define themselves to the system and report changes in status. Information about the processors 32A–G is maintained by the systems manager in a database called the Management Information Format (MIF) file 33. The system manager must also provide the request, reply, message interface 31 used by application agents to query status and obtain information about the products, mailing jobs and mailing pieces in progress over a network 34 providing client/server functions.

The system and models shown in FIGS. 5, 6 and 7 were developed by a council of users and vendors called LMO Systems Workgroup. That workgroup, comprised of research companies, is now known as the Data Management Task Force (DMTF) Finisher Workgroup, and was formed to identify key requirements of large mail room operations (LMO) and to explore the possibility of defining an open systems architecture standard for meeting them. This work resulted in demonstrating the capabilities of an integrated system at the "XPLOR" conference in November of 1993. The "Large Mailing Operations Standards Specification", Version 1.0, incorporated herein by reference, was published on Oct. 31, 1994, by the DMTF Finisher Workgroup and is available from IBM Printing Systems, Inc., Boulder, Colo., 80301-9191. It is the standard that has been developed by the workgroup to manage hardware and software processors in the large mail room operations systems environment.

The demand for standards is fostered by the need for selecting an architecture base that is widely accepted, easy to implement and extendable to future requirements. Customers and vendors alike need to feel that their solutions and products are built on interfaces that are durable and can take advantage of emerging technologies. In the desired system, easy to understand graphical interfaces commonly used on desktop computers are important.

In looking for currently available open systems standards for modeling the functions required in the large mail room operations (LMO) environment, the LMO standards work group discovered that the standard base that most closely meets these requirements is the DeskTop Management Interface (DMI). The DMI standard is managed by a group of companies calling themselves the DeskTop Management Taskforce (DMTF) who published the DeskTop Management Interface Specification, Version 1.0 on Apr. 29, 1994, incorporated herein by reference. The publication may be obtained from any company who is a member of the taskforce including IBM Corporation, P.O. Box 1900, Boulder, Colo. 80301-9191.

Implementations of the DMI are available today or committed in OS2, Workplace OS, DOS and AIX. Other platforms are sure to follow. By building IMO objects and management protocols on the DMI, LMO standards may be established in a uniform manner across all of these platforms.

In the terminology of DMI, components are physical or logical entities on a system such as hardware, software or firmware. Components may come with the system or may be added to it. The code that carries out management actions for a particular component is known as "Component Instrumentation". FIG. 8 shows a generic model of the DMI.

A management application 100 is a program that initiates management requests. A management application uses the DeskTop Management Interface to perform management operations. The management application is exemplified by a program such as an application with a graphical user interface (GUI), an application program agent, or it may be a network management protocol agent that translates requests from a standard network management protocol such as SNMP or CMIP to the DMI and back again.

The service layer 102 coordinates access to component instrumentation and component provided data in the Management Information Format (MIF) database 104.

One may note the natural relationship of the DMI model shown in FIG. 8 with the LMO model shown in FIG. 7.

In the use of the DMI, component descriptions are defined in a language called the "Management Information Format" (MIF). Each component has an MIF file to describe its manageable characteristics. When a component is initially installed into the system, the MIF file for that component is added to the MIF database 104 for use by the service layer.

The component interface (CI) 103 is used by component vendors to describe access to management information and to enable a component to be managed. The CI shields vendors from the complexity of encoding styles and management registration information. Vendors do not need to learn the details of emerging management protocols.

The management interface (MI) 101 is used by applications that wish to manage components. The MI shields management application vendors from understanding the different mechanisms used to obtain management information from elements within the system.

The CI and MI are data interfaces as opposed to procedural interfaces. Data blocks are used as the format for data transfer—not parameters to a function call. The behavioral mechanics of the CI and MI make up the data transfer mechanism.

The service layer (SL) 102 is an active, resident piece of code running on a computer system that mediates between the MI and the CI and provides access to the database 104.

It should be noted that the DeskTop Management Task Force which developed the DMI did so to close the gap between management software and the system components that require management on a desktop computer. Within a computer system, the DMI has been designed to be independent of any specific computer or operating system. It is designed to be independent of any specific management protocol. It is designed to be independent of a network but it is designed to be mappable to existing management protocols, e.g., CMIP or SNMP. Basically, however, the DMI is designed for a single desktop computer where components are physical or logical entities on the computer system, such as disk drives and word processors. The DMI does not address or specify a protocol for management over a network but the prospect of managing several desktop computers within a network was considered by the DeskTop Management Task Force. The IMO standards work group has greatly extended the vision of the DMI by applying it to a network which not only includes desktop computers, but also includes complex machinery, such as document finshers and inserters. Moreover, the vision of the DMI is extended to include large mainframe host equipment and processes running thereon. The IMO system calls for defining the manageable characteristics of complex machinery and the manageable characteristics of mainframes and mainframe processes in an MIF database so that these characteristics can be managed from a workstation or desktop computer or any GUI on the network.

SUMMARY OF THE RELATED INVENTIONS

In implementing the large mail room system manager model on the DMI interface several problems were revealed which resulted in the inventions which are the subject of this patent application and the related patent applications named above.

In a large mail room operation there are many hardware and software processes to be managed and many management applications requiring access and control over the manageable data. Most of these processes and management applications are located on, or controlled by computing systems other than the particular computing system containing the DMI and the MIF database. To satisfy the networking requirements of the large mail room operation, the DMI model needed to be extended to provide for client/server communication in a manner that preserved the syntax and semantics of the DMI standard, while enabling the service layer to continue to dynamically coordinate and arbitrate requests from the management applications to the specified component instrumentations. Related patent application Ser. No. 08/334,948 provides a solution to this problem. It was observed that because the nature of the service layer is to provide support that handles run time management of both the management interface and the component interface, simple request/reply, client/server protocols would not suffice. To solve this problem has required the invention of a network client protocol capable of handling three-way dialogues between clients, servers and instrumented components all residing on different nodes. To do that the client interface was established by supporting all of the functions of the MI and the CI at each of the required client platforms. This is accomplished by porting DMI function calls to those platforms and implementing them on a "Remote Procedure Call" (RPC) base using Transmission Control Protocol/ Internet Protocol (TCP/IP) as the transport carrier. The underlying RPC support is handled by the client interface code and is transparent to the DMI programmer. The invention enables operation in a consistent manner across a variety of operating systems, hardware platforms and different architectures. In addition, it is capable of allowing a client implemented on one architecture to inter-operate with a server implemented on another. The invention preserves the semantics and syntax of the MI and CI, while enabling data transfer mechanisms to and from client, servers and instrumented components, all of which may reside in different nodes in the network.

A problem faced in implementing the system manager models involved the many legacy applications running on mainframe platforms to prepare print jobs. In a large mail room operation there are many applications and value-add processes running on mainframe computers that need to be tracked and managed as an integral part of the mailing operation. Examples of these are programs which generate print output, like bills for mailing; programs which pre-sort customers' statements by postal characteristics; value-add processes that add bar code data to print images and build finishing instructions for individual mail pieces; and programs that further condition data objects for archiving, printing and insertion process steps in the workflow path of mailing. In many instances, these applications are not capable of generating direct calls to set values and report status in the DMI databases so that they can be managed using the standard management interfaces defined by the DMI. Related patent application Ser. No. 08/334,584 now U.S. Pat. No. 5,680,615 provides a solution to this problem. Because the characteristics of host programming can vary from one host system to another, it was determined that a data stream solution would be preferred to a procedure based program call solution. In the invention, agent programs to set control parameters in the DMI database for use by management applications are provided, so that tags inserted in the data stream can be fielded by the agent programs and converted into the proper format for setting control parameters in the DMI database. The basic building block of the invention is a self-defining "Tag Logical Element" (TLE) structured field which was already available in the Advanced Function Printing architecture. The TLE structured field in turn is comprised of two self-defining fields called triplets. One triplet identifies the TLE as a tag for setting DMI values. The other triplet contains the parameters used in setting specific attribute values in the DMI database. An instrumented agent is provided as an exit program in the host to split away the TLEs and send them to an agent program in the DMI server to interpret the tags and generate the DMI commands. The tags may be placed in the print stream by the applications themselves or by value-added processes at the host. Once the invention had been generated for application programs at the host, it became apparent that any program which generates TLE tags could submit those tags directly to the program agent in the DMI server and establish values in the MIF without needing to utilize C-language programming to interface with the MI. In this manner, management applications at any node in the system, not just a host, can utilize the simple TLE mechanism to set attribute values.

A problem confronting the inventors was to find an answer to common workflow-related questions, such as, where is a particular mail piece? In a large workflow-oriented system environment, like the environment for large mail room operations, there are a number of process steps that must be performed on a named unit of work, such as a mail piece, to answer such a query. Each process step is a manageable component with its own characteristics, its own processing states and a status that may be modeled and managed in the IMO system. Object-oriented models of mail jobs are best represented by tables of transactions for each of the many hardware and software process steps required in the mailing. Since a single mailing may have upwards of one million mail pieces, and a given LMO system may have multiple mailings active at the same time, rapid access in update of transaction entries in these tables is both a requirement and a challenge. Existing table management protocols in object-oriented environments, such as SNMP and CMIP, are not adequate to meet the volume and performance requirements of an IMO system. Database systems on the other hand, provide efficient query and reply access to large databases, but fail to provide modeling and reuse capabilities required in IMO systems. The invention described in related patent application Ser. No. 08/334,592 now U.S. Pat. No. 5,546,577 solves this problem. It provides instrumentation logic to efficiently develop all of the many DMI commands that are necessary to answer a management query such as "Where is the mail piece?" The invention shields the user from the need to understand the details of the MIF file and develop himself all of the necessary commands to obtain the data. The invention has also been carried further in that speed in answering the query is improved by providing instrumentation logic to map object-oriented protocols to efficient data management protocols to provide direct keyed access to mail job data located in a specially created database utilizing avilable database products such as DB2. The novel techniques herein provide instrumenting groups that are used for passing parameters and returning values for complex queries while using the standard facilities of existing management protocols. An example of the usefulness of the invention in the LMO environment is, for example, to track mail piece data. To do that, a group may be defined with attributes that are set to specify the mail piece and mail job identifiers. These attributes are input arguments for the search. After setting the search attributes, the management application issues a DMI "GET" command for the current value of the location of the attribute of the group. The DMI service layer responds by invoking the inventive instrumentation for the tracking component. The instrumented code issues all necessary commands to query each active process, locate the mail piece and return the location value. The instrumented code itself is a management application that uses the standard DMI interface. In other object management environments, such as SNMP, access may be provided through agent programs. The selection of the underlying database manager may vary from implementation to implementation and is transparent to the management application requesting the access.

SUMMARY OF THE INVENTION

A problem addressed by the inventors relates to the need for various management applications at various nodes to access the same data in the database for different functions in different report formats for different purposes. For example, a supply low event attribute may require the attention of a machine operator on one node. It may trigger an inventory transaction at a second node and it may cause rescheduling of mail jobs to match work with available supplies from a third node. Each of these functions and others may be performed by different users at different nodes in the LMO installation. Object-oriented modeling of the large mail room environment enables large volumes of attribute data associated with each step in the mailing process to be captured and maintained in the database. Attributes about products, mail jobs, insert jobs, printers, inserters, supplies, machine set-ups and finishing instructions may all be found in the object model of the various components of the system. The problem of accessing all of that data in various ways is compounded by the need to allow the object database to grow over time and report formats to change without requiring reprogramming to access new functions. Another difficult requirement is to allow customization of reports on an attribute by attribute basis for different users of the system. This invention provides a solution to these problems. To meet these requirements a table-driven technique has been invented that recognizes the generic structure of components, groups and attributes in any MIF file and defines the mapping of any attribute value in any component to any column in any window on the display in any order. The mapping of a specific collection of attributes to a particular window is called a report. Multiple reports may be associated with a particular user who is authorized to view and interact with the data to accomplish a task in the IMO system. The report definitions supported by this invention enable each attribute in a report to be controlled or monitored individually. The control functions provided include the ability to add additional controls as they become required and is provided for by the report definition structure.

BRIEF DESCRIPTION OF THE DRAWING

The invention is set forth in detail below with reference to the accompanying drawing a brief description of which follows.

FIG. 7 shows a model of the mailing operations manager developed to control the large mail room operation by providing an object-oriented database into which all of the various hardware and software components can define themselves and report changes in status.

FIG. 8 shows a model of the "Desktop Management Interface" (DMI) developed to manage the hardware and software components of a desktop computer, regardless of variations in operating system software, application software or hardware components comprising the desktop computing system. The desktop model of FIG. 8 is extended herein to describe the network model of FIG. 7.

FIG. 9 shows an overall view of the GUI process including building and updating reports.

FIG. 10A shows the details of building a copy of the database at the local node. FIG. 10B shows the structure of the copy, i.e., an MIF meta-data tree.

FIG. 11 shows the detailed processing steps through which reports are built.

FIG. 13 shows processing steps for updating a report.

DETAILED DESCRIPTION OF THE INVENTION

Figure 1:
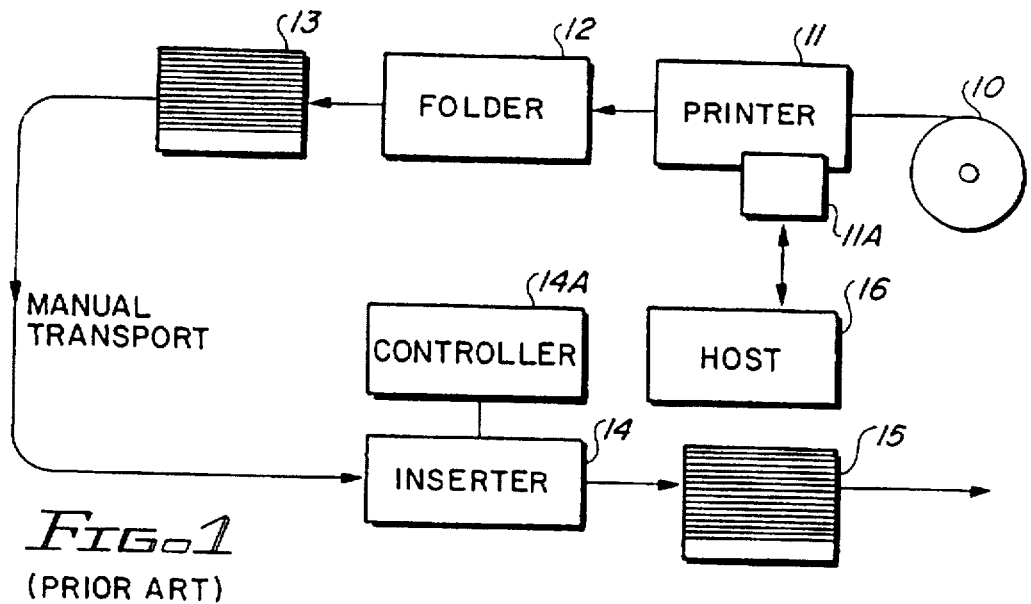
FIG. 1 shows a simplified configuration of a large mailroom system with a printer line for document preparation separate from an inserter line for accumulating documents in an envelope.
Figure 2:
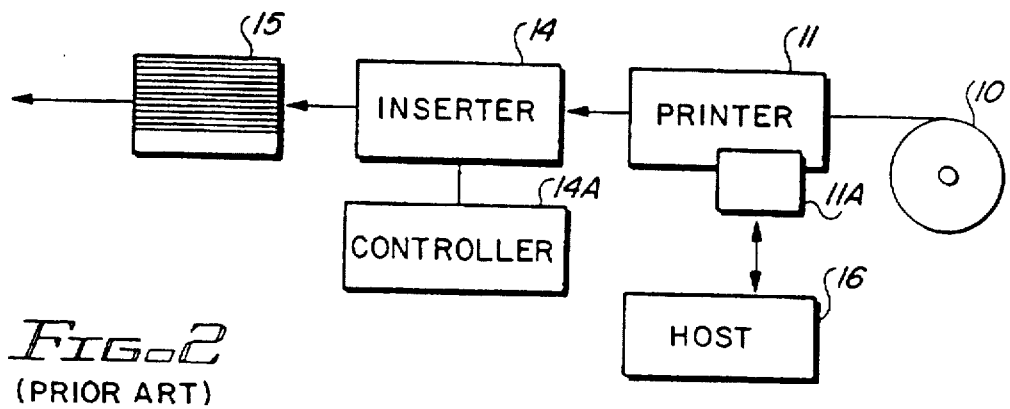
FIG. 2 shows a large mailroom system configuration with the printer line coupled directly to the equipment in the inserter line.
Figure 3:
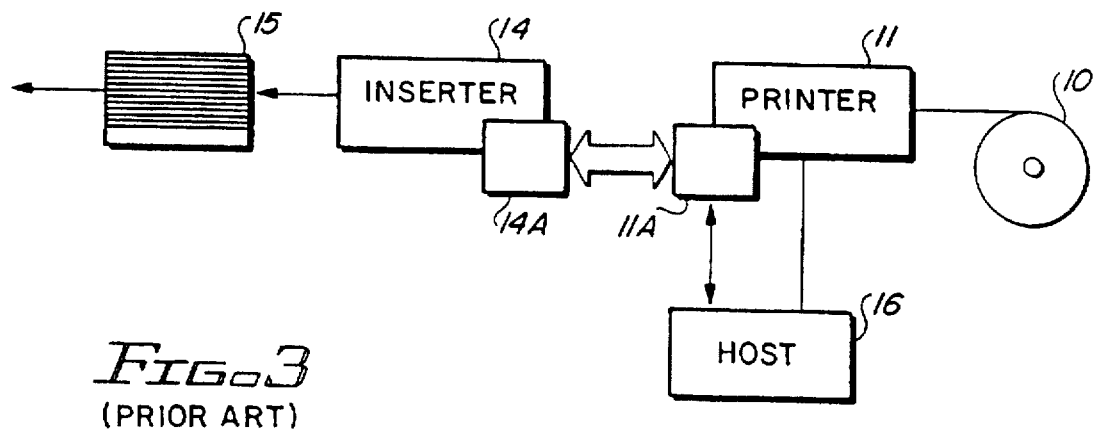
FIG. 3 illustrates a large mailroom system configuration wherein the controller of the printer is enabled to exchange information with the controller of the inserter.
Figure 4:
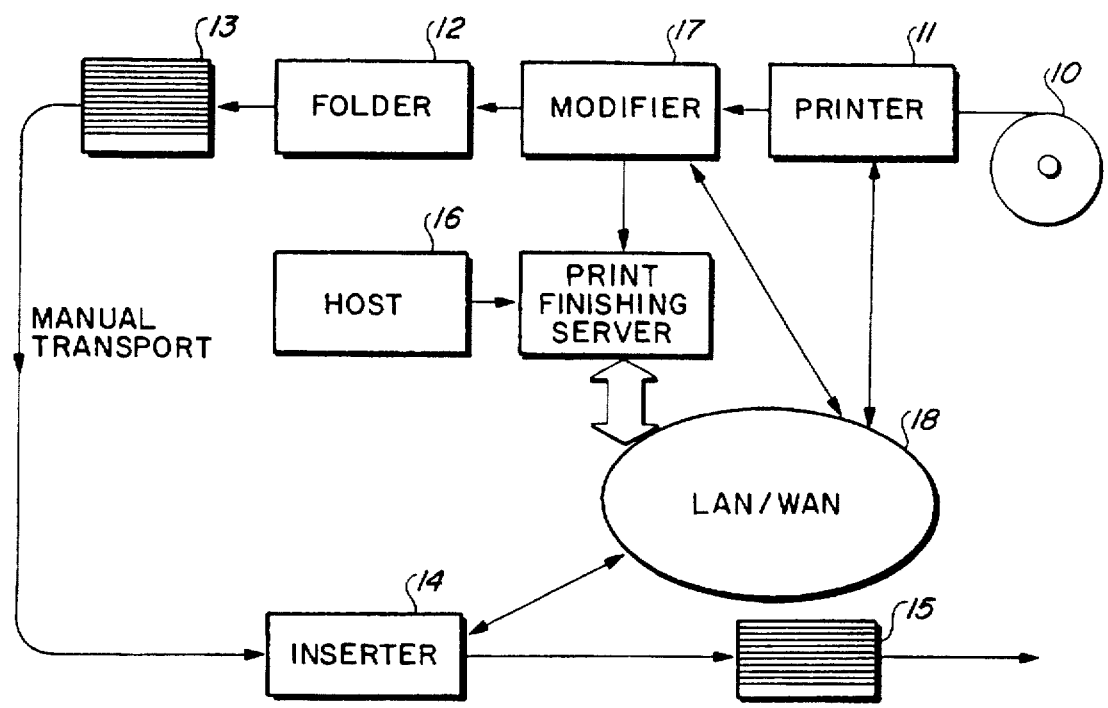
FIG. 4 shows a large mailroom system configuration wherein the output of the printer line is not directly coupled to the input of the inserter line, but the two lines are coupled over a network. The invention herein is designed for the network coupled configuration.
Figure 5:
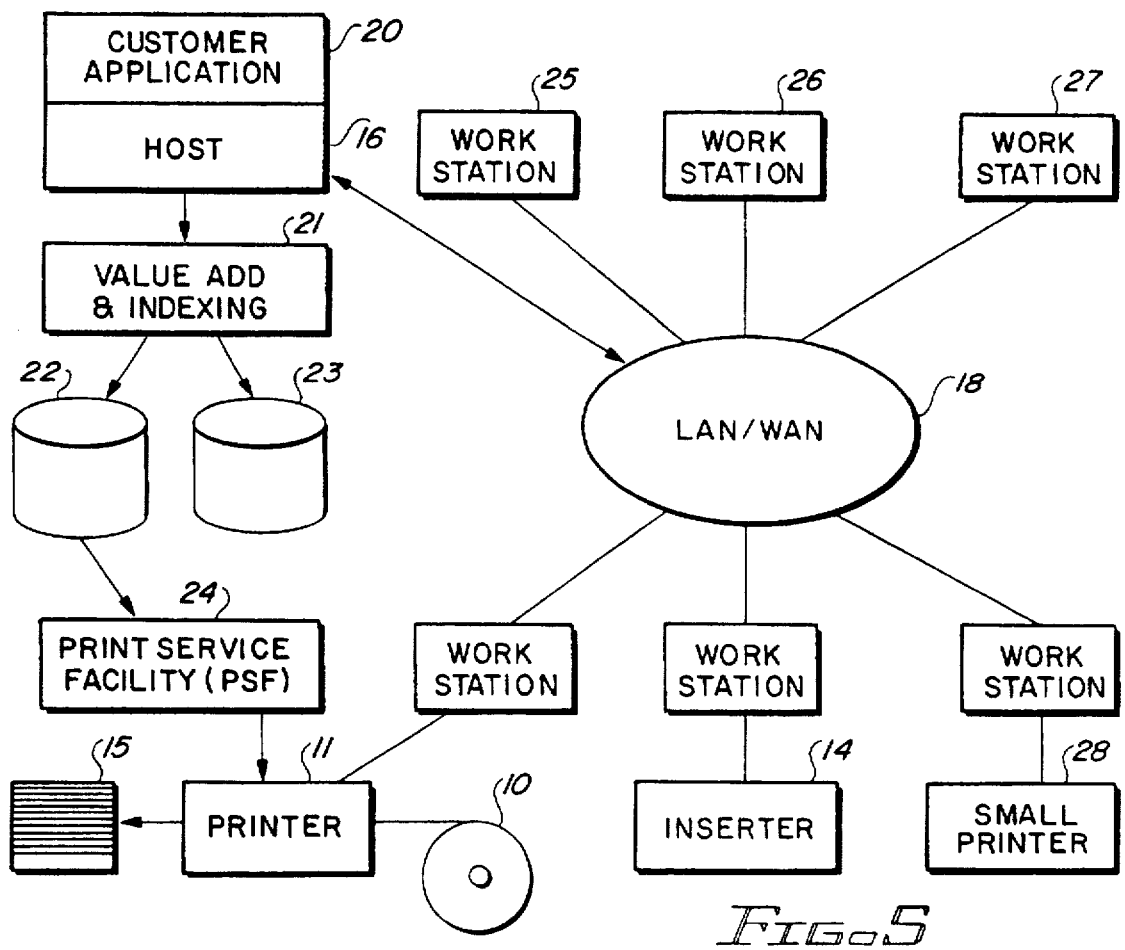
FIG. 5 shows a more complete depiction of the large mailroom network coupled system configuration of FIG. 4 and shows that a host or "mainframe" computer originating print jobs is coupled to the network together with many workstations which may be based upon desktop computers.
Figure 6:
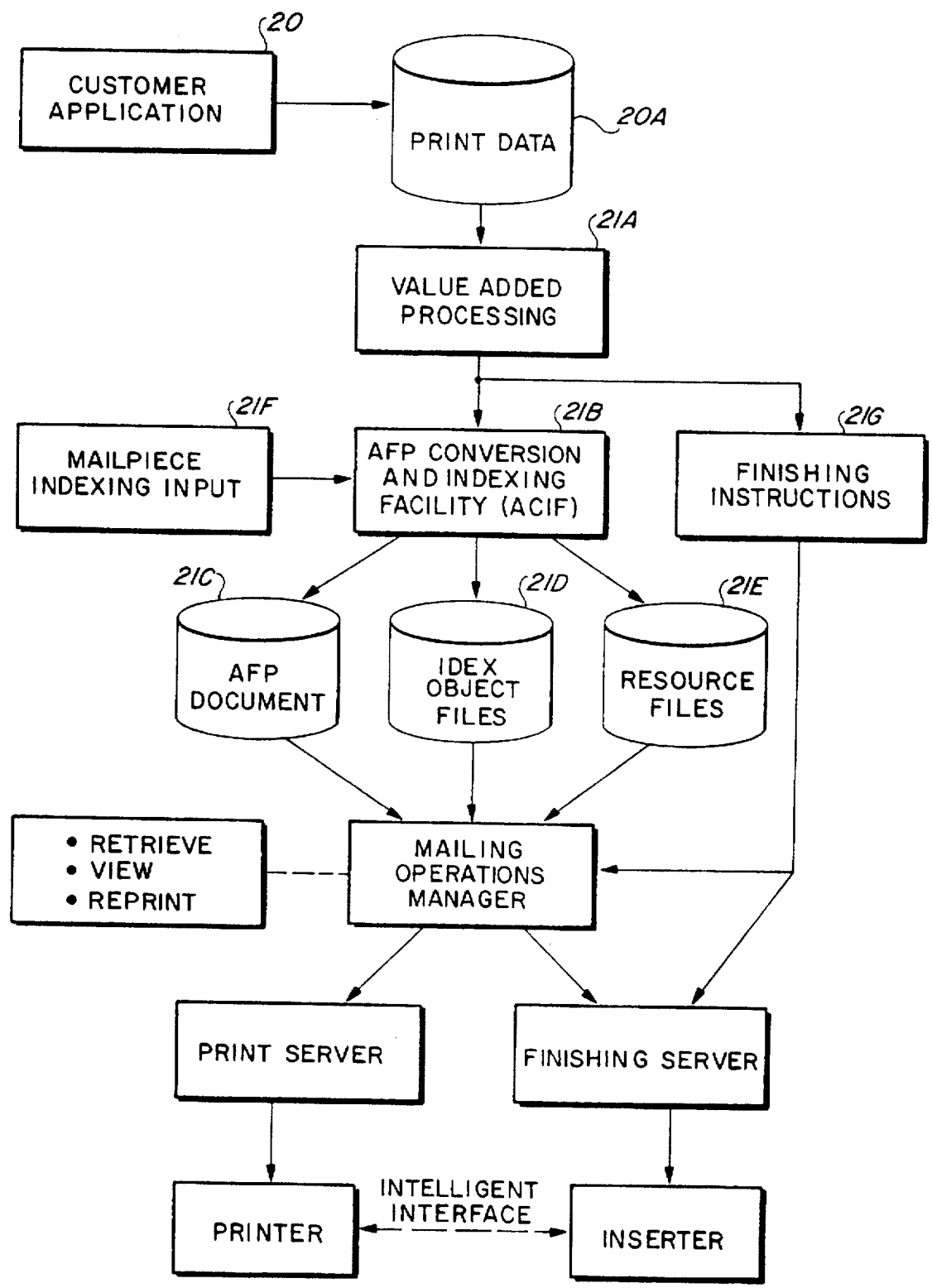
FIG. 6 shows an interface model of the system of FIG. 5 with many of the software and hardware components that must work together to automate the production of the individual mail pieces.

When reference is made to the drawing, like numerals indicate like parts and structural features in the various figures.

FIG. 7 is a model of the systems manager and shows various objects for the object-oriented database 33 which have been defined by the LMO standards work group. These are various object classes which were considered important in managing the large mail room operation. Object class 35 is the product object which describes the name and the attributes of a mailing, for example, a product may be a mailing of bills. The mail job object class 36 is an object which identifies a manageable segment of the total product. For example, a mail job may be two thousand accounts within the total billing product.

The next object class is the mail piece object 37 which describes a specific set of pages that go into a particular envelope, for example, that set of pages that go into making up one particular bill to one particular customer.

The process object 38 contains a description of the steps that a mail piece must go through for it to be created, printed and mailed.

The print object class 39 will include data files for the various devices in the system that put marks on paper, for example, an IBM 3900 printer.

The finishing object 40 contains MIF database objects which describe the attributes of those devices that do the processing on the finishing line. For example, the manageable attributes of an inserter machine or a sorter or a document feeder or a franking machine would be the type of object found under this object class.

The device object class 41 is for other equipment which may be used in one of the processes interacting on the mail piece. For example, this object class would include a database on color imprinters.

Also in FIG. 7 various so-called agent programs 32A–32D are illustrated. A facilities management agent 32B is a program that would be developed by the owner of a mail room operation to manage the particular facilities included within that operation. The supplies management agent 32C is a program which would be developed and supplied by the owner of the large mail room operation to implement the management of supplies needed within that operation, for example, postage, toner for printing machines, paper, etc. The management reports agent 32D reflects those various programs which would be developed by the owner of a large mail room operation to obtain the particular type of management information that is needed from the database 33. For example, a management report agent might be developed to obtain information relating to the scheduling of mail jobs within the entire operation, so that for example, if one printer line is down, the mail job may be scheduled into the workflow for another printer line. In addition to these agents, other agents may be developed for a particular installation. All of these agents may operate from the same node or from different nodes on the network but it is envisioned that each of these agents will be located in the most advantageous location within the operation. All desktop computers will be provided with the GUI agent 32A to establish the interface for all other agents to the mailing operations manager 30. The GUI agent is not supplied by the owner of the large mail room operation, but rather is supplied with the systems manager to provide a generalized interface for all GUI nodes.

In implementing the DMI standards, management information files (MIF) must be created in adherence with the DMI format. Files created in that format describe components which have attributes that have values and whose attributes can be assembled into groups.

A DMI component is any hardware or software device that can be connected to a computer system. In the LMO environment, this definition is extended to include such things as printers, inserters, status collectors, and various pre- and post-processing mechanisms.

An attribute is a characteristic or function or feature of a device, specifically a relevant and manageable characteristic. An attribute is a feature or function that a device manufacturer defines for expressing data values about the attribute. Applications systems used to monitor and control the device utilize attributes to manage it. An example of an attribute is the supplies that a printer uses.

A group is a "group of attributes". Attributes are assembled into groups based on their similarity of function or purpose. Examples of groups include such things as the input characteristics of printers or their output characteristics.

Attributes of devices have values attached to them. Some of these values are static values such as the name of the manufacturer of a printer, while other values are dynamic such as the number of pages that a printer has printed since it was installed.

MIF files are files describing components and their attributes. Each device manufacturer provides an MIF file that describes the characteristics of the device that can be managed. The MIF file is installed into the database of the system. The device makes itself known to the system through the MIF database.

Note that the system manager expands the DMI concept of a "component" to include not only hardware and software devices but also mail jobs and mail pieces in products being handled in the large mail room environment. Utilizing files developed in the MIF format, the system manager provides an interface to handle messages from devices to computer systems to create and update files about mail jobs and mail pieces. The system manager also provides interfaces so that users can query device status and obtain information about the various products, mailing jobs and mail pieces flowing through the system.

A third set of standards with which the system manager is compliant is the Advanced Function Print Data Stream (AFPDS) standard. This standard is described in "Mixed Object Document Content Architecture Reference," Document Number SC31-6802-02, Third Edition, June 1993, IBM Corporation, Department 588, P.O. Box 1900, Boulder, Colo. 80301-9191, U.S.A., and is incorporated herein by reference. This standard includes a data stream format that supports graphics, text, barcode and resources such as fonts, overlays, page segments, form definitions and page definitions. The reference describes data stream tagging, page 140 et seq. As more fully described in related patent application Ser. No. 08/334,584 now U.S. Pat. No. 5,680,618, data stream tagging is used to identify individual mail pieces and to track them through the printing and inserting process. Tagging product data streams allows a break up of a data file into logical documents, each identifying a particular mail piece or recipient. Such tagging allows not only the tracking of mail pieces through the printing and inserting process, but also allows logical documents like mail pieces to be retrieved, viewed and archived.

In creating the system, it is important that devices of all kinds from different vendors should be able to be connected to the mailing system without requiring modifications. In addition, the system must be extensible, that is, it should be possible to add services, commands and actions without requiring redesign of the system. Also, the system should be based on a client/server model to take advantage of the versatility afforded by networks. The system should use graphical user interface technology. An additional requirement of the system is that it should be portable across different operating systems and types of computing machines. Finally, the system should be configurable, that is, users should be able to tailor the data in the system to their own management requirements. The IMO systems work group has provided a standard to meet all of these requirements.

Each component, which may be a device or mail job that is added to or installed in the system, must have an accompanying management information format (MIF) file to describe the manageable aspects of the component. By adding the MIF file to the database, the component is made known to the system and thereby is made available for responding to management commands. Vendors of devices who wish to be compliant with the DMI format must supply MIF files for their devices and installation programs to present the MIF file to the database through the service layer.

In the database, attributes may be a single valued entry or they may be group attributes defining a table or array of related attributes and their values. An example of a group attribute that defines a table is "printer supplies". Since there may be several different supply types such as paper, toner, fuser oil, etc., each with different attribute values, the attribute "printer supply" points to a table or array of supply types and their attributes, rather than to a single value. Whenever the various attributes in a group define one or more rows in a table, a key is needed to define the attribute IDs that are used as indices to the table. By use of the key, the particular row and attribute in the table is found.

The DMI recognizes that some attributes represent static information, for example, the name of a vendor, and also include dynamic information, for example, the amount of paper on the unwinding machine. To obtain static information the request for an attribute value is fielded by the service layer and reference is made to the MIF database to answer the query. The same approach may be used for dynamic values. However, the database attribute value may not have been updated for some time. To obtain current values of dynamically changing attributes, the DMI makes available "component instrumentation" code for acquiring the attribute value from its source. When component instrumentation is used, the service layer branches to the component instrumentation to obtain the latest value for that attribute.

The description of each component in the MIF database is established according to a standard definition and utilizes clear text. The definition is of a component with groups and the attributes of those groups. The MIF format provides a keyable data structure. Once the description is in the system, the service layer enables the traversing of these different objects to monitor the values of the attributes in order to provide the data from which reports can be generated. A clear text file is one in which there is no particular formatting other than perhaps a delimiter, such as carriage return. Consequently, it is easily keyable information which may be described in any human language, English, German or whatever and translated into an ASCII database for use by the computer.

The management interface (MI) interfaces with the management applications to provide access to the data base for management functions. The command "DMIGET" would be used primarily by the management applications to request information through the service layer for a particular component. The service layer acknowledges receipt of the message and issues as many requests to different component instrumentations as necessary to satisfy the management request. If the initial request was for static information, the service layer would find that information in the database. If however, the request was for the current state of a device, the service layer would act as a mediator between the requestor and the component and would address component instrumentation through the component interface (CI) to obtain the current status of the device. Once ascertained, the current state would be passed on to the management requestor through the management interface. The command "DMISET" might be used by the hardware and software components through the component interface (CI) or by management applications through the MI to set information in the data field. All of the DMI commands and the control blocks for those commands are set out in the DMI specification which has been incorporated herein by reference.

The current invention provides a graphical user interface (GUI) through which a user may define reports and receive on a display requested information from the object-oriented database. The GUI is a generic interface that can be used in any type of environment, not just a large mail room operation. The GUI is particular to the DMI and is useful only in that environment, but it will display objects from the database regardless of what their content is. As a consequence, the networked system disclosed herein could be used to manage any kind of complex environment without reprogramming the GUI or any other aspect of the system manager, except for particular instrumented components.

Report definitions are placed in a table format. The information on a screen is determined by the requested information in the report definition. The GUI interface also prepares the report for the display in a table format, having rows and columns. Within the report definition, the user designates what is to be displayed in the rows and the columns. For example, a row request might be to display data relating to a particular printer, while columns may have, for example, component attributes. The intersection of the row and column for the printer may provide in the first column the model number; in another column the date of installation; in a third column the date of the last major maintenance; in the next column an indication of the current level of toner; in the next column the number of sheets printed in the current job and so on.

The GUI works in much the same way as any other Windows application. A mouse is normally used to navigate the Windows and by clicking the mouse indicating an entry. The GUI supplies a Window with a title bar, labeled "Systems Manager" and with the typical controls such as a menu selection bar and control buttons to minimize or maximize the Window. A tool bar is also provided to allow the user to select actions without going through the menus.

Appendix I shows several typical displays together with a description of the major functions provided on that display.

The GUI contains several features, including chain actions, accomplished by double clicking on a particular location in the display. Double clicking may be used to invoke another report, update a dialogue box, display a byte map, etc.

The report can also chain on pattern matching. For example, if the status of a printer is requested and the status indication is "jammed", the chain associated with the status may cause a change in color so that the word "jammed" appears on the display in red.

The GUI provides an update capability that enables direct interaction with the service layer. If the information requested in the database is recorded under keys, then the keys may be presented in a dialogue box by utilizing the update capability to provide a direct view of the data in the database.

Basically, the GUI provides the user with the ability to manage the information in the database in the manner in which the user has interest. For example, a machine operator may wish to manage the database information in a particular fashion, while a facilities manager might be interested in looking at that same data to produce a different report. The GUI provides a simple mechanism for defining the reports that the particular user desires. This is accomplished by providing a table driven interface in the DMI environment.

The structure of the GUI is shown in FIGS. 9–14. With reference to FIG. 9, when use of the GUI commences, an initialization process 300 is begun which includes starting the status timer to update the time on the status bar each minute. At step 301, various login processing is performed to establish the user/account session. At this time, the account name, password, and server/host name is received by the GUI. The GUI makes connection to the DMI network service layer on the server using the host name. The account file may be searched for the account record, the account name and the password. The user name is obtained from the account record together with polling intervals, action flags, and "get" permissions. A report list is built including a control flag for each group in a group list. A poll timer is started to initiate polling for each polling interval.

At step 302, the GUI builds an MIF meta-data tree. Meta-data is basically component and group information to describe the structure of the DMI objects; in some cases it can also include attribute data. At this step, consequently, the GUI builds a list of component data for each DMI component, a list of group data for each DMI group for each component, and a list of attribute data for each DMI attribute for each group. In that manner, a local copy of complex structures is obtained to optimize access. The process carried out in step 302 is shown in more detail in FIGS. 10A and 10B.

At step 303, the GUI obtains initial report names to build and display reports of the log-in. If there are no reports marked "log-in" the GUI builds and displays a report that the user selects.

At step 304, the standard report display logic is exercised to build and display the report that the user selects. The process carried out in step 304 is shown in more detail in FIG. 11. In general, to build a report, a report definition is converted into a parse tree using custom recursive descent parser. The row instance array is built by searching meta-data for row definition matches. A view table is built by walking the row instance array and searching meta-data for column definition matches. For each element in the view table either meta-data is gotten or a DMI value. The GUI then creates a report window on the display with column headings from the parse tree. The contents of the view table are displayed on the GUI report window and the windows are arranged based on the action flag and the account record.

With the report now displayed on the GUI, a custom menu is created on the menu bar for each menu definition in the parse table. Updating the display occurs at step 305 and is described in more detail at FIG. 13.

At step 306, the GUI checks for messages from the window manager. If a status timer message has been received, the date/time status will be updated on the window. If a double click has occurred, if a tool bar button has been depressed, or if a dynamic menu item has been selected, the chain action processor 311 is invoked. If a polling timer message is received at step 312, row polling is performed at step 313, column polling is performed at step 314 and if any changes are indicated at step 315, the display is updated at step 316.

If the user logs out at step 317, it is necessary to initialize again beginning with the log-in at step 301 before the GUI can again be utilized, otherwise, return is made to monitor messages from the window manager.

When column polling is performed at step 314, the elements in the table are updated each time the polling timer expires. That is done for each report displayed on the screen and for each element in the view table. A request is made to the DMI for a new value and when it is returned, the window is updated if the value has changed.

When row polling is performed at step 313 to update the number of rows in a table, it is done for each report displayed on the screen. The GUI consults each row definition in the parse table to see if there is time to poll. A temporary row instance array is built by searching meta-data for row definition matches. If a temporary row instance array is different from the current row instance array, the temporary row instance array is substituted. The view table is rebuilt and the window is resized if the number of rows has changed and an action flag indicates that the GUI should resize on the poll.

If a double click action is invoked at step 308, the report definition syntax will describe the action to be taken. The GUI will select the associated chain action from the parse table and perform parameters substitution on chain arguments. The chain handler will be invoked.

A chain action may change the color of a pattern in the report window by checking for a string pattern or numeric range match and if a match is found, to select the action required from the parse table. If a color action display value is specified, a change in color will occur.

Chain actions are also used to update an MIF dialogue box. If a dialogue box is created and if a DMI group contains keys, a key field is displayed in the top half of the dialogue box for each DMI key. For updating the group, an attribute field is displayed in the bottom half of the dialogue box for each DMI attribute in the group. For an attribute update the GUI creates a single attribute field in the bottom half of the dialogue box for the selected DMI attribute.

The GUI provides drop down fields for key fields. If a user selects drop down, the DMI is queried for possible matches of the specified key.

Various buttons are displayed including "GET" and "SET" in order to invoke the DMI. If the user selects the "GET" button, the DMI is invoked to get the requested attribute, group or row from the DMI. If the user selects the "SET" button and has modified at least one attribute, the DMI is invoked to set the modified attribute.

The GUI provides a clear button for user selection to clear all fields and the cache that is used for the drop down key field support.

Another major function is the browser function which is invoked using the browser button on the tool bar. The browser button may be used to display information for a selected DMI object. It will provide a box with a hierarchy made of DMI component, group, attribute and value. Browser can invoke the DMI update dialogue box at the group attribute or value levels. It can also request the DMI description field by using a help button at the component, group or attribute level.

A chart graphics function is provided so that a user can associate various types of charts with a report. If selected, the chart is displayed when the report is opened. The GUI also provides the user with the opportunity to request a chart by selecting a region of a report table using the mouse.

To access the database to obtain a particular report the GUI operates from a report definition. The report definition is provided by a user according to the report definition syntax. The syntax of the report is composed of a table block to define the format of the tabular report. In that report the user will define a title, the type of font, whether it is to be charted and, most importantly, the rows and columns of information to be displayed. The row block will define the instances to be retrieved from the DMI to form rows in the table and one or more column blocks will define the attributes of instances to be retrieved from the DMI to form columns in the table. If the definition includes a chain action, the chain statement will define the type of action to be performed on double click or when the chain button on the tool bar is selected. A complete description of the report definition syntax is included as Appendix II and an example report definition is included as Appendix III.

FIGS. 10A and 10B expand on step 302 shown in FIG. 9 to build an MIF meta-data tree. FIG. 10B is a diagrammatic illustration of the fact that groups are associated with components, and attributes are associated with groups. FIG. 10A shows the process steps for building the meta-data tree. The purpose of building the tree is to provide a local copy of the structure of the DMI objects for optimizing access to the database. FIG. 10A describes a straight forward approach to obtaining each component, each group associated with each component, and the attributes associated with each group.

FIG. 11 is a detailed description of the processing steps through which reports are built as described at step 304 of FIG. 9. To build a report, reference is made to the report definition at step 320 to read and parse that definition into its row and column requirements. At step 321 the meta-data tree is searched using the row definitions. Step 321 is expanded in FIG. 11 to show that the definition from the report is used to build row definitions by finding matches in the MIF meta-data tree at step 322. Step 322 is expanded in FIG. 12. Before describing that, note that the processing in FIG. 11 also includes searching the MIF meta-data tree using column definitions from the report definition table at step 323. The process for finding the matches in step 323 is similar to that for finding the row matches in step 322.

Figure 12:
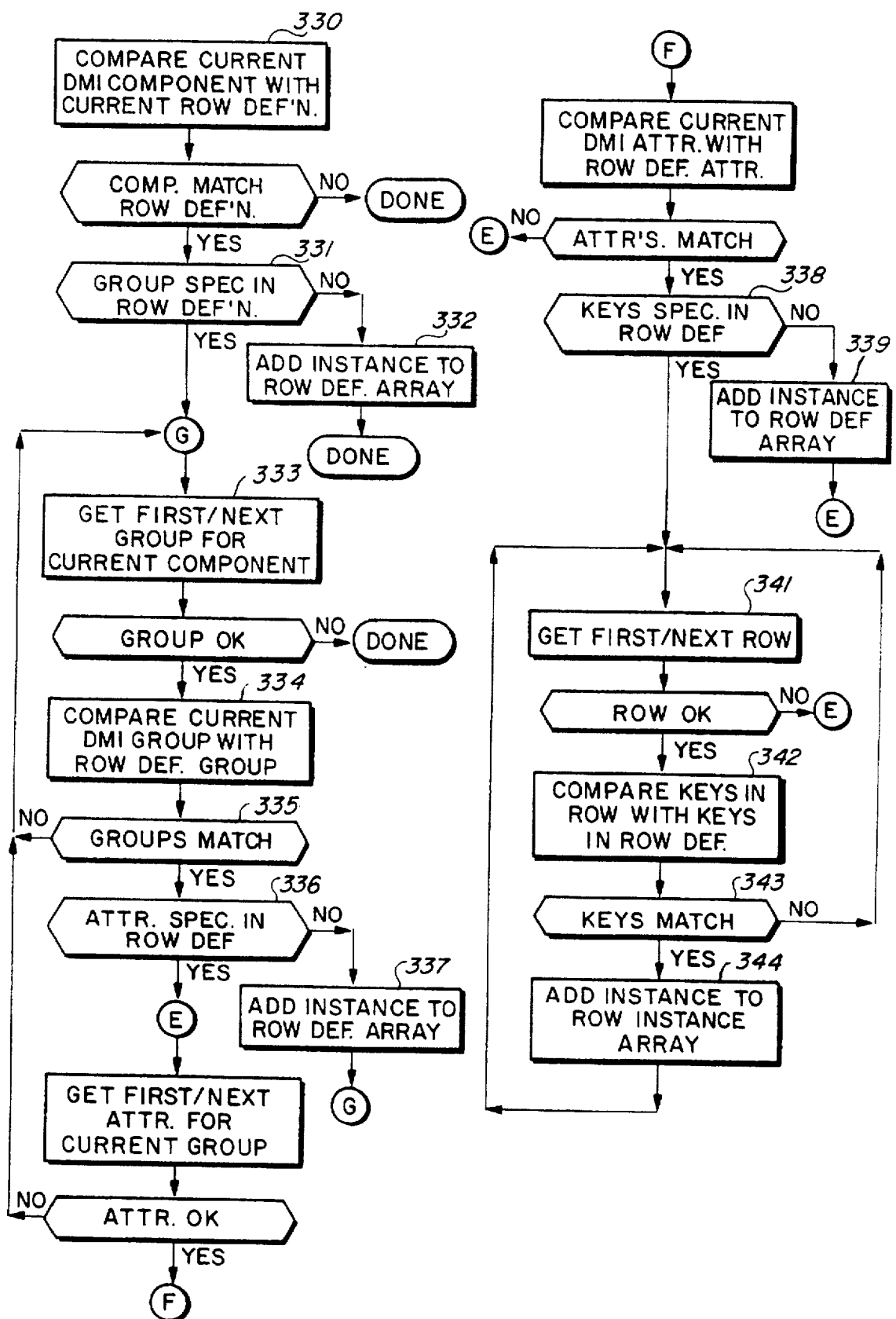
FIG. 12 expands the process of FIG. 11 showing details of searching for row matches in building a report.

FIG. 12 shows details of the process to search the MIF meta-data for row definition matches. The process begins at step 330 with a comparison of the current DMI component with the current row definition. If there is a match, a query is made at step 331 to determine whether groups are specified in the row definition. If they are not, the GUI adds an instance to the row. definition array at step 332. If a group was specified in the row definition, steps 333–335 are carried out to find a DMI match to the group defined in the definition. When a match is found, a query is made at step 336 as to whether attributes are specified in the row definition. If they are not, the GUI adds an instance to the row definition array at step 337. If attributes were specified, the various attributes for the current group are obtained from the DMI for comparison with the report definition. When an attribute match is found the GUI inquires as to the presence of keys in the row definition at step 338. If there were no keys specified, the GUI adds an instance to the row definition array at step 339. If keys were specified, row data is obtained from the DMI using the key specified from the row definition. At steps 341, 342 and 343 successive rows are obtained from the DMI to compare keys in the DMI row with the keys in the row definition. When a match occurs an instance is added to the row instance array at step 344.

Once all of the keys specified for an attribute have been searched a branch is made to obtain the next attribute and continue the search. Once all of the attributes have been searched, a branch is made to obtain the next group. After all groups have been searched for that component the report row definition is complete. A process similar to what has just been described with respect to a row is also carried out for obtaining column data.

FIG. 13 is an expansion of the process steps needed to update the display at step 305 in FIG. 9. To update the display values are obtained from the DMI at step 350. Values are checked for special action at step 351. If a color action is indicated at step 352, the GUI selects the specified color. If a chain action is indicated at step 353 the GUI invokes the chain action processor at step 354.

Figure 14:
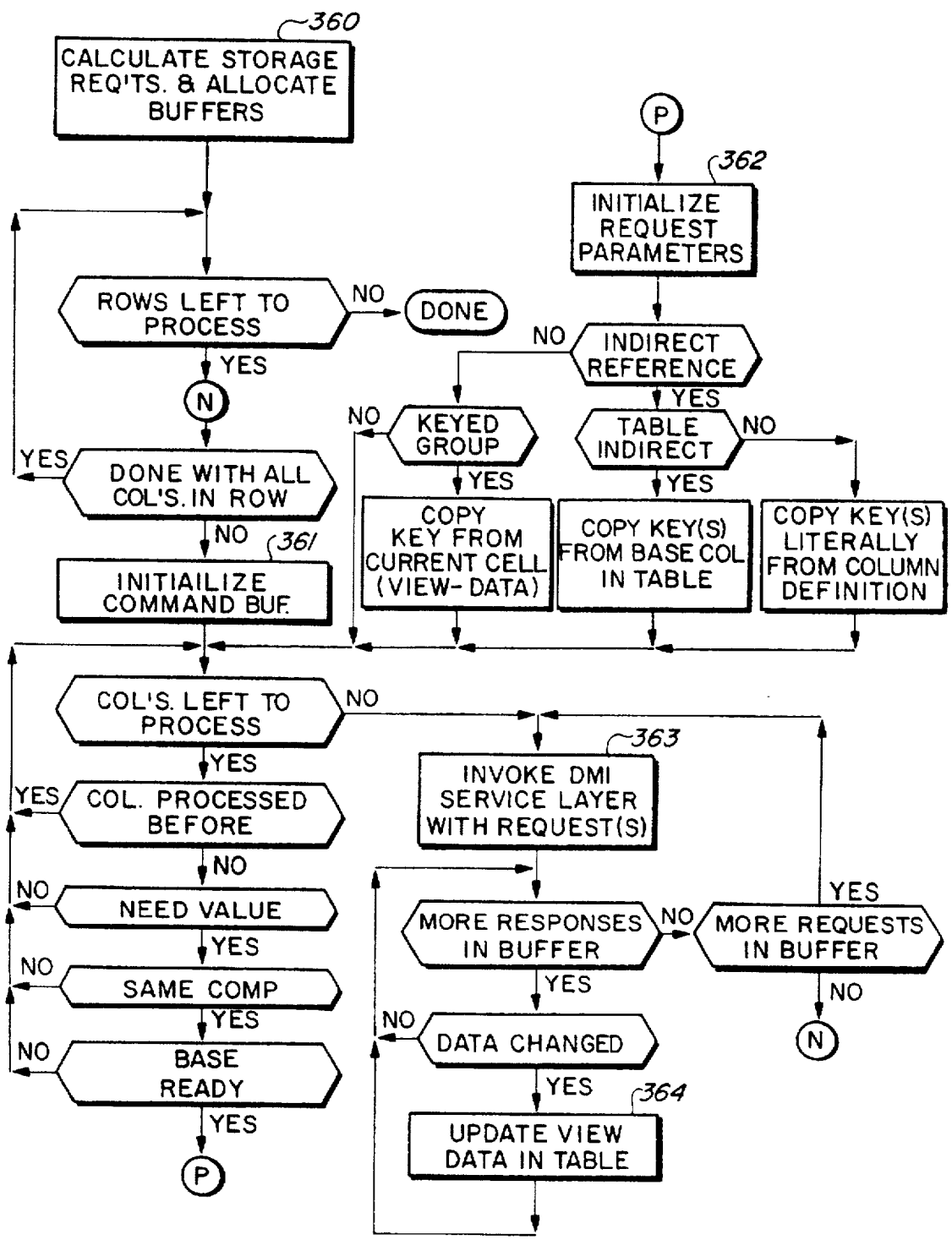
FIG. 14 shows details of obtaining values for a report in the updating process.

FIG. 14 shows the processing steps to obtain values from the DMI at step 350 in greater detail. At step 360 the GUI calculates storage requirements and allocates an appropriately sized buffer. If rows are left to process the next row is selected and if additional column data is needed for that row, a command buffer is initialized at step 361. Where columns are still to be processed and values needed, the request parameters are initialized at step 362 to obtain keys. Once all requests have been identified, the DMI service layer is invoked with the needed requests at step 363 to get values from the DMI. The DMI returns a first response to the confirm buffer and if data is changed the view data is updated at step 364. The processing continues until all requests in the request buffer have been exhausted.

Thus a GUI process has been devised for acting upon report definitions and comparing the definitions therein with data retrieved from the DMI interface to display the data required by the report definition. The requirements to utilize the graphical user interface are to specify the component, the group, and the attribute information in the report definition. The DMI interface can be probed with appropriate commands generated by the GUI to obtain the requested data and display it in the format desired. The interface is generic to any component, group and attribute whether those identities define the type of management characteristics to be associated with a large mail room operation or whether those identities define the manageable characteristics associated with a rolling mill process, a chemical process or with managing a computer system or any complex process. The table driven GUI recognizes the generic structure of components, groups and attributes and allows the mapping of any attribute value in any component to any column in any window on the display in any order.

While the invention has been described above with respect to a specific embodiment it will be understood by those skilled in the art that various changes in form and detail may be made therein without departing from the spirit and scope of the invention. Again, changes in form and detail do not depart from the spirit and scope of the invention which receives definition in the following claims.

What is claimed:

1. A table driven graphical user interface (GUI) method for producing a display at a local node on a network, said display being defined at said local node by a user of the GUI generating a report definition comprising row blocks and column blocks, said table driven GUI method providing for machine-implemented steps comprising:

providing for the utilization of a Desktop Management Interface (DMI) at a node on said network with an object-oriented database wherein objects are organized according to DMI standards with components in an object class, manageable attributes that have values associated with each component, and groups organizing similar attributes of the component, said row blocks and column blocks specifying those of said components, said groups and said attributes selected for display;

providing for parsing said report definition into report row definitions and report column definitions to build a parse table for driving said GUI;

providing for requesting data from said object-oriented database through said DMI to find a first component therein which matches with a report row definition, establishing a row instance array for a view table by getting row instances for said first component including matches of groups and attributes to add row instances for said display in accordance with said report definition;

providing for requesting data from said database through said DMI to find a next component therein and if it matches with a report row definition, adding row instances to said row instance array by getting row instances for said next component including matches of groups and attributes to add row instances for said display in accordance with said report definition;

providing for continuing to request data from said database until all report row definitions are processed;

providing for requesting data from said database through said DMI to find elements for said view table by matching the attributes of the first row instance in said row instance array with the report column definitions of components, groups and attributes to add elements for said display in accordance with said report definitions;

providing for requesting data from said database through said DMI to find elements for said view table by matching the attributes of a next row instance in said row instance array with report column definitions including matches of components, groups and attributes to add elements for said display in accordance with said report definitions; and providing for continuing to search said database until all column definitions in said report definition have been processed.

2. The method of claim 1 further including the step of providing for obtaining a local node copy through said DMI of said object-oriented database for each component in said report definition including all groups and attributes associated with those components and wherein the steps of requesting data in said database are accomplished by addressing said copy at said local node.

3. The method of claim 1 further including the step of providing for the invocation of chain action functions so that the display includes the result of chain action functions.

4. The method of claim 1 further including the step of providing for the updating of data in said view table through the GUI performed steps of:

allocating an appropriately sized buffer;

initializing request parameters;

invoking said DMI with said requests;

receiving requested data in said buffer; and comparing received data in said buffer with data in said view table and, if changed, updating said view table.

5. The method of claim 1 further including the step of providing for the updating of row data in said view table by the GUI performed steps of:

performing row polling for a displayed view table by consulting each row definition in said parse table and building a temporary row instance array by searching for row definition matches; and substituting said temporary row instance array for said row instance array if a change has occurred and rebuilding said view table utilizing said temporary row instance array.

6. The method of claim 5 further including the step of providing for the updating of column data in said view table by the GUI performed steps of:

performing column polling for each report displayed and for each element in said view table;

invoking said DMI for new values; and updating said view table if a changed value is found.

7. The method of claim 6 wherein the step of providing for updating includes the GUI performed steps of:

allocating an appropriately sized buffer;

initializing request parameters for invoking said DMI service layer;

receiving requested data in said buffer; and comparing received data in said buffer with data in said view table and, if changed, updating said view table.

8. The method of claim 1 further including the step of providing for the updating of column data in said view table by the GUI performed steps of:

performing column polling for each report displayed and for each element therein;

invoking said DMI for new values; and updating said view table if a changed value is found.

9. A table driven graphical user interface system for producing a display at a local node on a network, said display being defined at said local node by the user of the GUI in a report definition comprised of row blocks and column blocks, said system comprising:

a Desktop Management Interface (DMI) and an object-oriented database at a node on said network wherein objects are organized according to DMI standards with components in an object class, manageable attributes that have values associated with each component, and groups organizing similar attributes of the component, said row blocks and column blocks specifying those of said components, said groups and said attributes for display;

means for parsing said report definition into report row definitions and report column definitions to build a parse table for driving said Desktop Management Interface system;

means for requesting data through said DMI from said object-oriented database to find a first component therein and means for comparing said first component with a report row definition, if a match is found, means for establishing a row instance array for a view table by getting row instances for said first component including matches of groups and attributes in accordance with said report definition;

means for requesting data through said DMI from said database to find a next component therein and means for matching said next component with a report row definition, and if a match is found, means for adding row instances to said row instance array by getting row instances for said next component including matches of groups and attributes in accordance with said report definition;

means for continuing to search data from said database until all report row definitions have been processed;

means for requesting data through said DMI from said database to find elements for said view table, and comparing the attributes of said first row instance with said column definitions including matches of components, groups and attributes to add elements for said display in accordance with said report definitions;

means for requesting data through said DMI from said database to find elements for said view table by matching the attributes of a next row instance in said row instance array with said report column definitions including matches of components, groups and attributes to add elements for said display in accordance with said report definitions; and means for continuing to search said database until all column definitions have been processed.

10. The system of claim 9 further including means for producing a local copy through said DMI of said object-oriented database for each component in said report definition including all groups and attributes associated with those components and further including means for obtaining data from said local copy at said local node.

11. The system of claim 9 further including means for invoking chain action functions.

12. The system of claim 9 further including means for updating data in said view table including means for invoking the Data Management Interface service layer to request data, means for allocating a confirm buffer, means for receiving requested data in said confirm buffer, means for comparing data in said confirm buffer with data in said view table, and means for replacing data in said view table with data in said confirm buffer.

13. The system of claim 9 further including means for periodically polling said row definitions in said parse table and requesting matches from said database to build a temporary row instance array, and means for comparing said temporary row instance array with said row instance array and, if a change is found, means for substituting said temporary row instance array to update said view table.

14. The system of claim 13 further including means for periodically polling said column definitions in said parse table and requesting matches from said database, means for comparing data requested from said database with corresponding data elements in said view table and, if changed, means for replacing said corresponding data elements.

15. The system of claim 14 further including means for updating data in said view table including means for invoking the Data Management Interface service layer to request data, means for allocating a confirm buffer, means for receiving requested data in said confirm buffer, means for comparing data in said confirm buffer with data in said view table, and means for replacing data in said view table with data in said confirm buffer.

16. The system of claim 9 further including means for periodically polling said column definitions in said parse table and requesting matches from said database, means for comparing data requested from said database with corresponding data elements in said view table and, if changed, means for replacing said corresponding data elements.

\* \* \* \* \*

UNITED STATES PATENT AND TRADEMARK OFFICE
CERTIFICATE OF CORRECTION

PATENT NO. : 5,778,377
DATED : July 7, 1998
INVENTOR(S) : Marlin et al.

It is certified that error appears in the above-identified patent and that said Letters Patent is hereby corrected as shown below:

On the title page, item [56]
References cited should include:

```
        U.S. PATENT DOCUMENTS
   4,805,099    2/89      Huber
   5,448,375    9/95      Cooper et al.
   5,499,371    3/96      Henninger et al.
```

Signed and Sealed this

Eleventh Day of January, 2000

Attest:

Attesting Officer

Q. TODD DICKINSON

Acting Commissioner of Patents and Trademarks